United States Patent [19]

Ohta

[11] Patent Number: 5,005,469

[45] Date of Patent: Apr. 9, 1991

[54] CYLINDER LINER UNIT FOR USE IN AN INTERNAL COMBUSTION ENGINE

[75] Inventor: Masanori Ohta, Kawasaki, Japan

[73] Assignee: Isuzu Jidosha Kabushiki Kaisha, Japan

[21] Appl. No.: 420,910

[22] Filed: Oct. 13, 1989

[30] Foreign Application Priority Data

Oct. 14, 1988 [JP] Japan ................................ 63-259154

[51] Int. Cl.[5] .......................... F01B 11/02; F16J 10/00

[52] U.S. Cl. .............................. 92/169.4; 29/888.061; 92/170.1; 123/41.84; 123/668

[58] Field of Search ................. 92/169.2, 169.4, 170.1; 123/41.83, 41.84, 668, 669; 29/888.06, 888.061

[56] References Cited

U.S. PATENT DOCUMENTS 4,337,735 7/1982 Lichtner et al. .................... 123/688

4,856,462 8/1989 Ushio et al. .......................... 123/688

4,905,642 3/1990 Suzuki et al. ........................ 123/688

FOREIGN PATENT DOCUMENTS 2572968 11/1985 France .

2194473 11/1985 United Kingdom .

*Primary Examiner*—Ronald C. Capossela

*Attorney, Agent, or Firm*—Ostrolenk, Faber, Gerb & Soffen

[57] ABSTRACT

A cylinder liner unit comprises a plurality of cylinder liners made of a non-aluminum alloy for use in an internal combustion engine and uniformly covered with a layer of an aluminum series alloy around the plurality of cylinder liners so as to be integrally combined by the layer of aluminum series alloy layer in unity. Thereafter, the integrally combined cylinder liner unit is casted in a cylinder block made of an aluminum alloy.

18 Claims, 2 Drawing Sheets

CYLINDER LINER UNIT FOR USE IN AN INTERNAL COMBUSTION ENGINE

BACKGROUND OF THE INVENTION

The present invention relates to a cylinder linear unit for use in an internal combustion engine, and more particularly, to a cylinder linear unit which is adapted to be cast in a cylinder block made of an aluminum alloy.

Recently, cylinder blocks made of an aluminum alloy have been used in mass produced automobile engines. As a material for cylinder liners, a non-aluminum alloy such as cast iron or ceramics is generally used.

FIG. 6 is a plan view of an cylinder block of a four-cylinder engine. The cylinder block is manufactured by casting cylinder liners 2 made of a non-aluminum alloy in a cylinder block 1 made of an aluminum alloy. The cylinder block 1 must be provided with a water jacket 5. When casting the cylinder block, it is difficult to precisely position each of cylinder liners 2 in place, so that it is complicated and costly to produce a metallic mold for the casting liners.

Japanese Utility Model Laid-Open Application Sho 61-107461 discloses that, as shown in FIG. 6, the thickness of an aluminum alloy base material interposed in interspace D between adjacent cylinder liners 2 should be substantially equal to the wall thickness of the cylinder 2 to prevent deformation of the cylinder liner 2 during thermal expansion.

When the interspace D between adjacent cylinder liners 2 is reduced, however, the flow of molten metal becomes worse during the casting operation of large-sized castings such as a cylinder block and defects in casting such as cleavage and cavities in molten metal are liable to occur. This is applicable to an engine having a reduced bore pitch.

In order to eliminate the above-mentioned disadvantages of separately casting the cylinder liners 2 one by one, an integrally combined cylinder liner unit 10 made of cast iron as shown in FIG. 5 is employed. The cylinder unit 10 integrally combined by connecting bores 11 with connectiong portions C is cast in a cylinder block 1 made of an aluminum alloy, as shown in FIG. 4.

In the case where an integrally combined cylinder liner unit made of cast iron is employed, the material of the cylinder block located around the liner (which is an aluminum alloy) does not melt and combine with the cast iron of the liner. Consequently, the cylinder block is separated from the cylinder liner at portions A and B shown in FIG. 4 to open outward, resulting in decrease in the strength of the cylinder liner and leakage of water and combustion gas.

In addition, since a connecting portion C exists in the cylinder liner, the radial wall thickness of the cylinder liner around each bore 11 is not uniform at every circumferential point of the bore. Consequently, when temperature of the cylinder liner rises during running of an engine, the thermal expansion of the cylinder liner is not uniform at every circumferential point thereof and the bore 11 loses its roundness.

As a result, the output of the engine decreases due to gas leakage. Additionally, there is insufficient compression and an increase in oil consumption due to leakage of lubricant oil.

SUMMARY OF THE INVENTION

It is an object of the present invention to eliminate the above-mentioned disadvantages by providing a cylinder block unit casting in which a plurality of cylinder liners made of a non-aluminum alloy are cast in a cylinder block made of an aluminum alloy such that both are firmly combined, and there is no decrease in the engine output and no increase in consumption of lubricant oil even during running of the engine.

The present intention is a cylinder liner unit for use in an internal combustion engine which unit is to be cast in a cylinder block made of an aluminum alloy, the cylinder liner unit comprising a plurality of cylinder liners each made of a non-aluminum alloy such as cast iron or ceramics and uniformly covered with a layer of an aluminum series alloy such that the cylinder liners are integrally combined as a unit.

The integrally combined cylinder liner unit, whose liners are pricisely positioned and easily and integrally combined as a unit, is capable of being precisely positioned in a cylinder block made of an aluminum alloy when being cast.

When the integrally combined cylinder liner unit is cast in the cylinder block made of an aluminum alloy, since material of the outer surroundings of the integrally combined cylinder liner unit is the same series as the material of the cylinder block, both the cylinder liner unit and cylinder block are firmly combined by melting. The outer surroundings of the cylinder liner unit are thus strengthened and no leakage of water and gas occurs.

In addition, the radial wall thickness of the cylinder liner is uniform in all circumferential points thereof and the cylinder liner deforms by thermal expansion in a true circle, incurring no decrease in output of the engine and no increase in consumption of lubricant oil.

Thus, the present invention avoids any likelihood that defects in casting may be caused and has the additional effect of improving performance of an engine manufactured by using the cylinder block casting.

BRIEF DESCRIPTION OF THE DRAWINGS

FIG. 4 being a plan view of a cylinder block in which an integrally combined cylinder liner unit shown in FIG. 5 is casted, FIG. 5 being a perspective view of an integrally combined cylinder liner unit and FIG. 6 being a plan view of another conventional cylinder block.

DESCRIPTION OF PREFERRED EMBODIMENT

An embodiment of a cylinder liner unit according to the present invention is described hereinafter with reference to the accompanying drawings.

Figure 2:
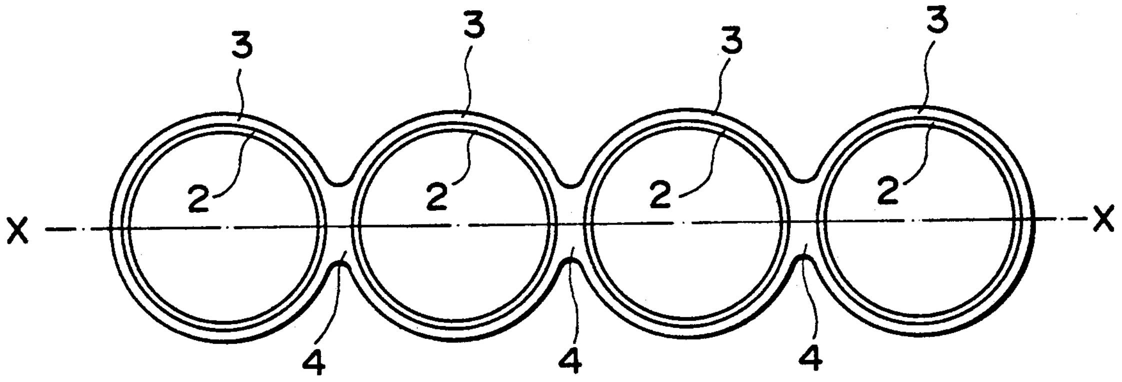
Figure 3:
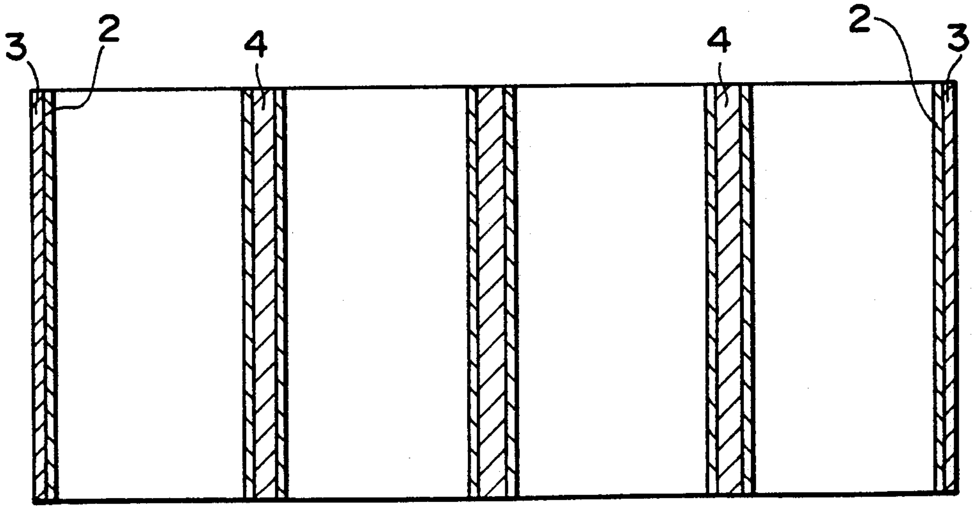
Figure 4:
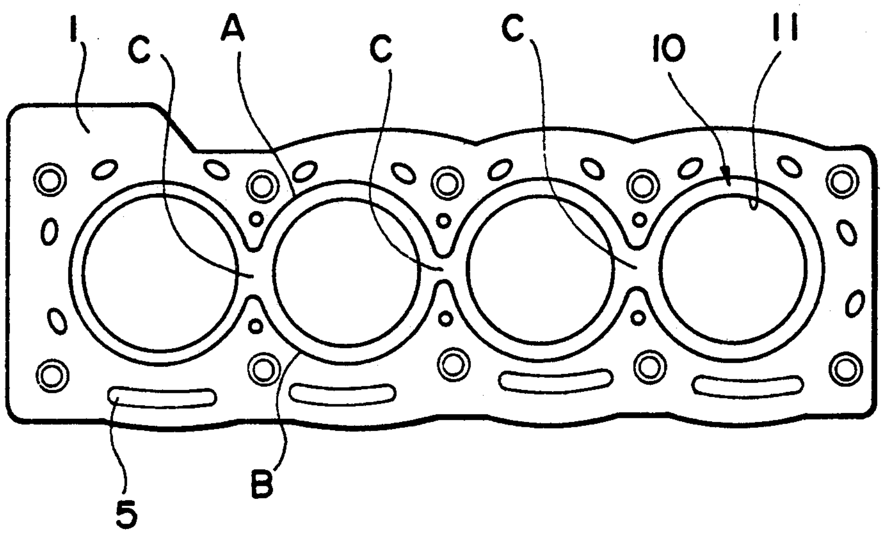
FIG. 4 (PRIOR ART)
FIGS. 4 to 6 show a conventional art.

An integrally combined cylinder liner unit shown in FIG. 2 is manufactured by covering four cylinder liners 2 made of a non-aluninum alloy such as cast iron or ceramics with an aluminum alloy by casting so as to be integrally combined therewith in as a unit. Namely, aluminum alloy layers 3 around the cylinder liners 2 are integrally combined by connecting portions 4 to form a monolithic unit. The aluminum alloy layer 3 may be an aluminum series alloy material which melts and combines with an aluminum alloy of the cylinder block 1.

Figure 1:
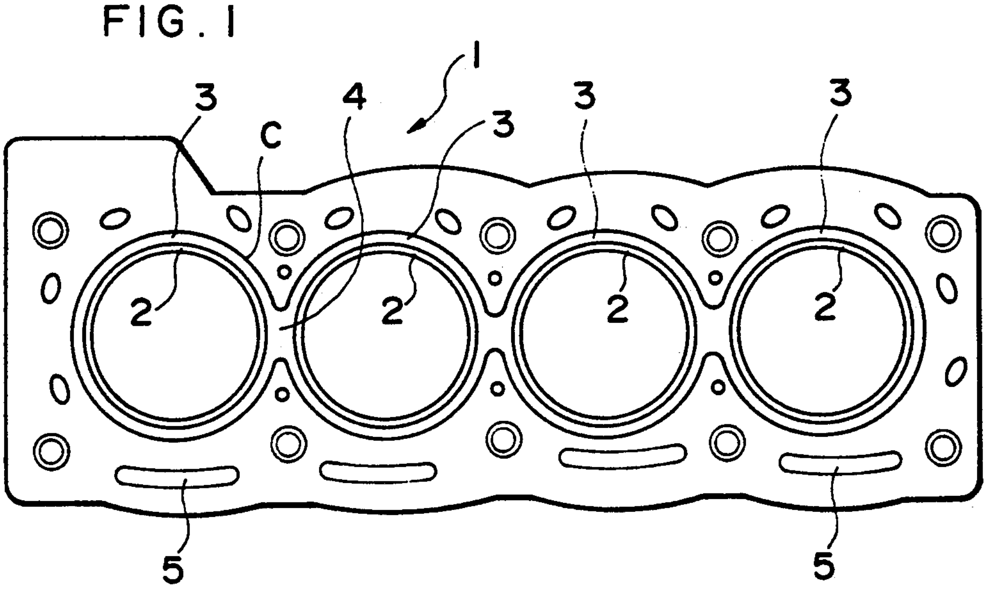
FIGS. 1 to 3 show an embodiment of a cylinder liner unit according the present invention, FIG. 1 being a plan view of a cylinder block, FIG. 2 being a plan view of an integrally combined cylinder liner unit and FIG. 3 being a section view taken on line X—X in FIG. 2.

The state in which the integrally combined cylinder liner unit has been cast in the cylinder block 1 made of an aluminum alloy in an ordinary manner is shown in FIG. 1. When casting the cylinder block 1, the integrally combined cylinder liner unit is cast in the cylinder block while forming water jackets 5. At this time, all cylinder liners 2 have been integrated by the aluminum layers 3 into a monolithic unit, so that the accuracy of positioning the cylinder liners 2 may be improved.

Even when the bore pitch between the cylinder liners 2 is reduced, there in no portion to impede the flow of molten metal in the outer configuration of the integrally combined cylinder liner unit shown in FIG. 2. As a result, no defect in casting occurs and it is possible to manufacture a cylinder block of good quality.

Figure 5:
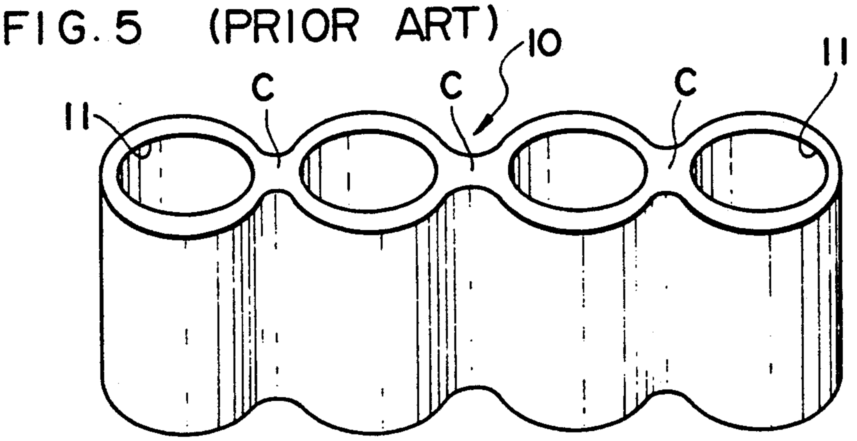
FIG. 5 (PRIOR ART)
Figure 6:
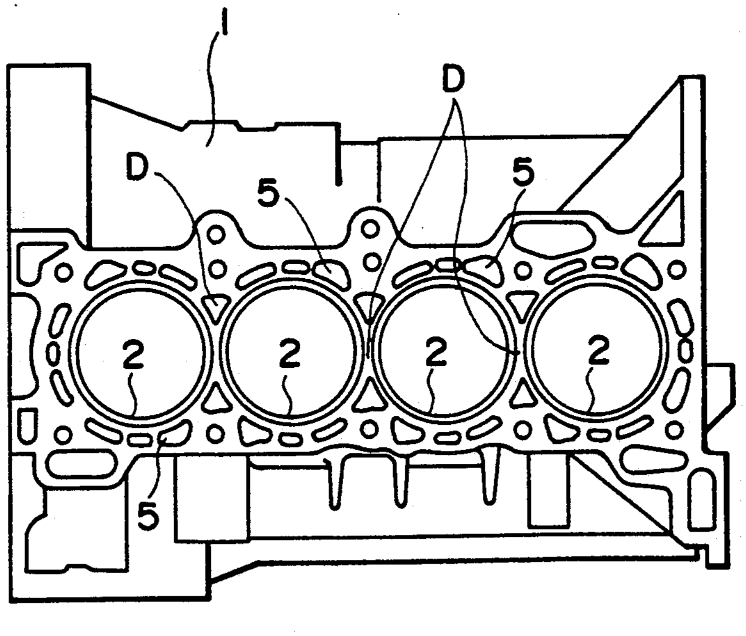
FIG. 6 (PRIOR ART)

The cylinder block 1 includes the aluminum layer 3 around four cylinder liners 2. The outer edge of the aluminum alloy layer 3 melts and combines with the cylinder block 1 made of the same series material as that of the aluminum alloy layer, so that both are firmly combined. As a result, there is no separation even at a portion C (FIG. 5) which is liable to separate in a conventional cylinder block and the surroundings of the cylinder liner 2 are strengthened, so that there may be no leakage of water and gas.

The radial wall thickness of the cylinder liner 2 is uniform at every point around the circumference thereof. Consequently, an engine manufactured by employing the casting according to the present invention, during running, deforms in a true circle by thermal expansion, so that there is no decrease in output of the engine and no increase in consumption of lubricant oil.

What is claimed is:

1. A cylinder liner unit for use in an internal combustion engine which unit is adapted to be cast in a cylinder block made of an aluminum alloy, said cylinder liner unit comprising:

a plurality of cylinder liners made of a non-aluminum alloy; and a layer of an aluminum alloy covering said plurality of cylinder liners around the circumference thereof to a substantially uniform radial thickness so as to integrally combine said plurality of cylinder liners into a single unit which can be subsequently cast in a cylinder block.

2. The cylinder liner unit of claim 1, wherein said layer of aluminum alloy is substantially homogenous throughout its full radial thickness.

3. The cylinder liner unit of claim 2, wherein each of said cylinders has a central axis and wherein each of said central axes are parallel to and spaced from one another.

4. The cylinder liner unit of claim 3, wherein each of said axes lie in a common plane.

5. A cylinder liner unit for use in an internal combustion engine which unit is adapted to be cast in a cylinder block made of an aluminum alloy, said cylinder liner unit comprising:

a plurality of cylinder liners made of a non-aluminum alloy;

a layer of an aluminum alloy surrounding said plurality of cylinder liners to form an integral unit, said layer of aluminum alloy being substantially homogenous throughout its full radial length.

6. The cylinder liner unit of claim 5, wherein an outer contour of said aluminum alloy layer closely follows an outer cylindrical contour of said plurality of cylinder liners.

7. The cylinder liner unit of claim 6, wherein each of said cylinder liners has a central axis and wherein said axes are parallel to and spaced from one another.

8. The cylinder liner unit of claim 7, wherein each of said axes lies in a common plane.

9. In combination:

(A) a cylinder liner unit including:

(1) a plurality of cylinder liners made of a non-aluminum alloy; and (2) a layer of aluminum alloy covering said plurality of cylinder liners around the circumference thereof so as to integrally combine said plurality of cylinder liners into a single unit; and (B) a cylinder block made of an aluminum alloy, said cylinder block surrounding said layer of aluminum alloy so as to imbed said cylinder liner unit in said cylinder block.

10. The combination of claim 9, wherein said layer of aluminum alloy has a substantially uniform radial thickness.

11. The combination of claim 10, wherein said layer of aluminum alloy is substantially homogenous throughout its full radial thickness.

12. The combination of claim 11, wherein each of said cylinder liners has a central axis which is parallel to and spaced from the central axes of the remaining said cylinder liners.

13. The combination of claim 12, wherein each of said axes lies in a common plane.

14. The combination of claim 9, wherein said layer of aluminum alloy is substantially homogenous through its full radial thickness.

15. The cylinder liner unit of claim 14, wherein each of said cylinder liners has a central axis and wherein each of said central axes are parallel to and spaced from one another.

16. The combination of claim 15, wherein each of said axes lie a common plane.

17. A method comprising the steps:

(A) forming a cylinder liner unit comprising:

(1) a plurality of cylinder liners made of a non-aluminum alloy; and (2) a layer of aluminum alloy covering said plurality of cylinder liners around the circumference thereof so as to integrally combine said plurality of cylinder liners into a single cylinder liner unit; and thereafter (B) casting a cylinder block around the outside of said cylinder liner so as to integrally imbed said cylinder liner unit in said cylinder block.

18. The method of claim 17, wherein said step of forming a cylinder liner comprises the steps of:

arranging a plurality of cylinder liners made of a non-aluminum alloy so that said cylinder liners are parallel to but spaced from one another; and a casting an aluminum alloy around said cylinder liners to form a unitary cylinder liner unit.

* * * * *